May 18, 1926.

G. E. RANDOLPH 1,585,560

TRACTOR HITCH

Filed Nov. 12, 1923

INVENTOR
GEORGE E. RANDOLPH
BY
Harry C. Schroeder
ATTORNEY

May 18, 1926.

G. E. RANDOLPH

TRACTOR HITCH

Filed Nov. 12, 1923

INVENTOR
GEORGE E. RANDOLPH
BY
ATTORNEY

Patented May 18, 1926.

1,585,560

UNITED STATES PATENT OFFICE.

GEORGE E. RANDOLPH, OF OAKLAND, CALIFORNIA, ASSIGNOR TO UNITED IRON WORKS, OF OAKLAND, CALIFORNIA, A CORPORATION OF CALIFORNIA.

TRACTOR HITCH.

Application filed November 12, 1923. Serial No. 674,237.

My invention is an improved hitch and load carrying saddle for road tractors, whereby a trailer may be secured thereto.

The object of my invention is to carry a part of the trailer load upon bearings which are positioned on the driving axle or on the hub of the driving wheel.

Heretofore the trailer load has always been thrown upon the axle housing and upon the bearings within this housing, which resulted in serious damage to the bearings and housing.

My invention consists of a saddle which reaches across the axle housing and is journaled directly upon the axle or wheel hubs, thus placing the load directly upon the wheel.

In one form of my invention the saddle has a bearing which is mounted directly on the hubs of the wheels. Therefore none of the weight is placed directly on the axle. In another form the bearing for the end of the saddle is located on the axle closely adjacent the hubs of the wheel so that the axle is subjected to comparatively little bending stress from the weight transferred from the saddle.

In the annexed drawing in which my invention is illustrated, I have shown the preferred embodiment but it may also be embodied in other forms, and in this application I desire to cover my invention in whatever form it may be embodied.

Referring to the drawings.

Figure 1:
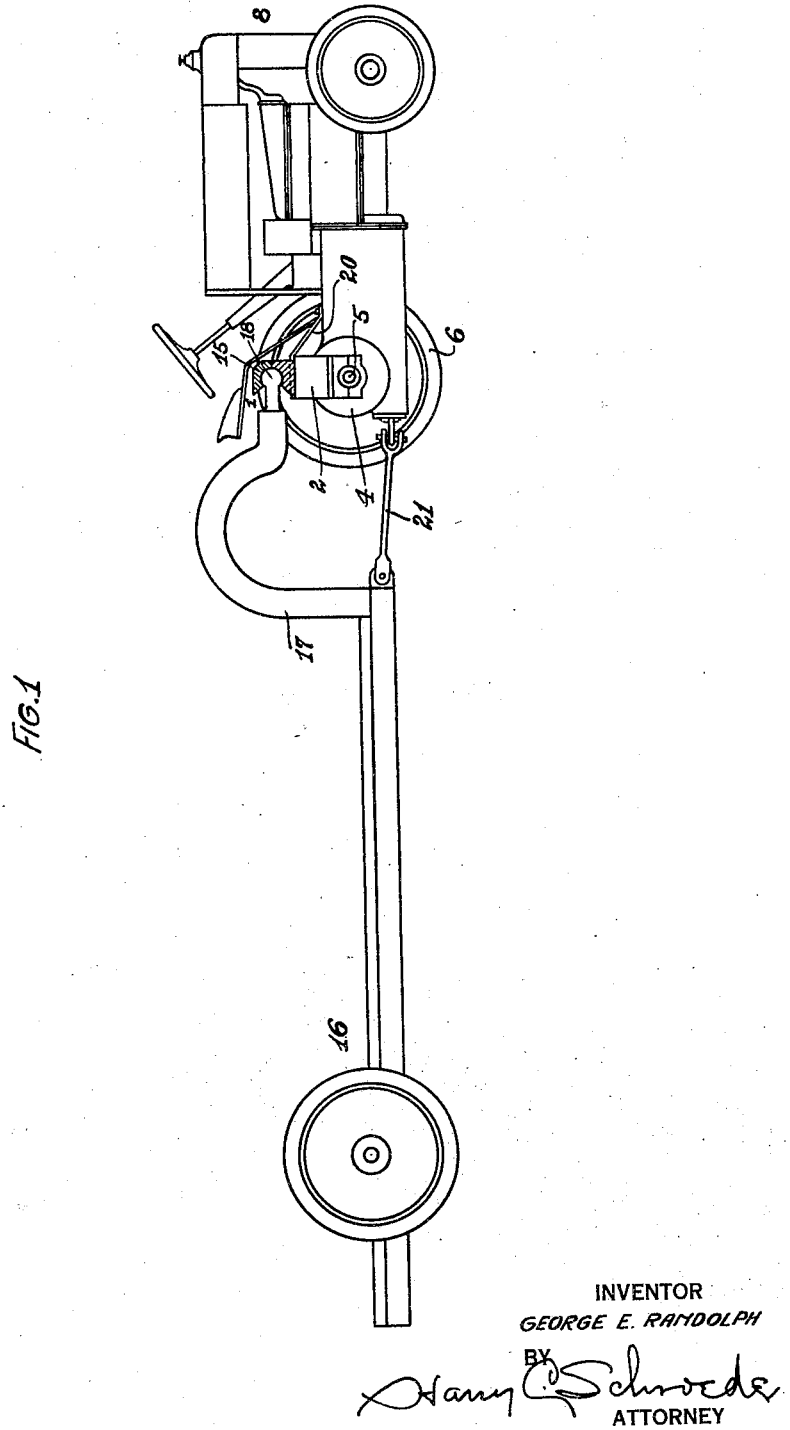
Figure 1 is a side view partly in section of my hitch mounted on a tractor, and with a trailer secured thereto.

Referring more particularly to the drawing, my hitch comprises a saddle 1, which consists of arms 2 and 3 spanning the axle housing 4. An axle 5 extends through the housing 4 and drives the wheels 6 and 7 in the usual manner for this type of tractor 8.

Figure 2:
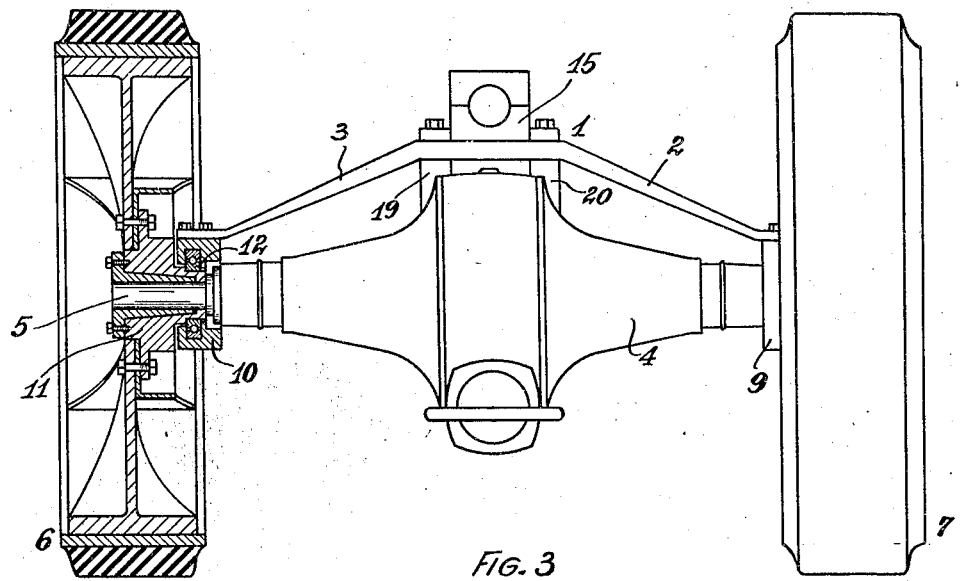
Figure 2 is a rear view partly in section of my hitch secured to a tractor.
Figure 3:
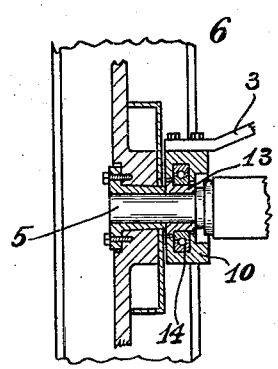
Figure 3 is a fragmentary longitudinal sectional view of a modified form of saddle bearing.

The arms 2 and 3 are suitably secured at their outer ends to the yokes 9 and 10 respectively. As shown in Figure 2 the yokes surround the hubs 11—11 of the wheels 6 and 7 and are suitably journaled thereto, as by the ball bearings 12. It will be seen that the load is carried on the hub and through said hub to the wheel. As shown in Figure 3, a collar 13 is secured to the axle 5, and the yokes 9 and 10 are journaled thereupon by means of the ball bearing 14. The saddle bearings are thus close to the wheel so that there is comparatively little bending stress thrown on the axle.

A block 15 is secured to the center of the saddle 1, and the trailer 16 is secured thereto by means of an arm 17 secured to the trailer and a ball 18 formed on the end of said arm and adapted to fit within the block, thus forming a ball joint. The ball joint provides ample movement between the tractor and trailer while turning, as well as carrying the trailer load to the saddle 1. Tension straps 19 and 20 are secured to the saddle 1 and to the tractor 8 to hold the saddle in an upright position.

A draft bar 21 is secured to the trailer 16 and tractor 8 by means of which the trailer is pulled along.

Having described my invention, I claim:

1. In combination with a tractor having a rotating axle and wheels secured and rotated by said axle, a load carrying saddle, a rotatable device to support the ends of the saddle adjacent the outer ends of the said axle and means to secure a trailer to the said saddle.

2. In combination with a tractor comprising a rotating axle and wheels secured to said axle to be rotated thereby, of a load carrying saddle, rotating sleeves surrounding said axle, means to journal the outer ends of said saddle to said sleeves, and means to secure a trailer to said saddle.

3. In combination with a tractor comprising a rotary axle and wheels secured to said axle to be rotated thereby, of a load carrying saddle, yokes to which the ends of said saddle are secured, rotating sleeves surrounding said axle on which said yokes are journaled, and means to secure a trailer to said saddle.

4. In combination with a tractor comprising a rotary axle and wheels secured to said axle to be rotated thereby, of a load carrying saddle, rotating sleeves surrounding said axle, means to journal the outer ends of said saddle to said sleeves, a block secured to said saddle, an arm on the trailer, and a ball formed on said arm adapted to fit into said block.

5. In combination with a tractor having a rotating axle with wheels secured thereon to be rotated thereby, of a stationary loading carrying saddle, rotary bearings for the end of said saddle adjacent said wheels, said bearings being positioned relative to the axle whereby the load from the saddle is transferred to the axle in close proximity to the place of transference of the weight from the wheels to the axle and means to secure a trailer to the saddle.

6. In combination with a trailer having a rotating axle, hubs and wheels secured to the axle and rotated thereby, a load carrying saddle having stationary yokes secured to the ends of the saddle, a rotary bearing positioned between the yokes and the axle and means to transfer the weight from the yokes to the axle adjacent the ends thereof, and means to secure a trailer to the said saddle.

In testimony whereof I affix my signature.

GEORGE E. RANDOLPH.